(12) United States Patent
Nguyen (10) Patent No.: US 10,572,886 B2
(45) Date of Patent: Feb. 25, 2020

(54) OBTAINING INFORMATION ON PURCHASING PROCESSES

(75) Inventor: Binh Q. Nguyen, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 3380 days.

(21) Appl. No.: 10/119,995

(22) Filed: Apr. 10, 2002

(65) Prior Publication Data

US 2003/0195812 A1   Oct. 16, 2003

(51) Int. Cl.
*G06Q 40/00* (2012.01)
*G06Q 30/02* (2012.01)

(52) U.S. Cl.
CPC ................. *G06Q 30/02* (2013.01)

(58) Field of Classification Search
CPC .......... G06Q 30/0246; G06Q 10/0637; G06Q 30/02; G06Q 30/0207; G06Q 30/06; G06Q 30/0623; G06Q 30/0635; G06Q 30/0641
USPC .................. 705/14, 26, 27, 10, 14.41, 14.53
See application file for complete search history.

(56) References Cited

U.S. PATENT DOCUMENTS

| | | | |
|---|---|---|---|
| 4,833,607 A | 5/1989 | Dethloff et al. | 364/401 |
| 5,832,457 A | 11/1998 | O'Brien et al. | 705/14 |
| 5,857,175 A | 1/1999 | Day et al. | 705/14 |
| 5,933,811 A * | 8/1999 | Angles | G06Q 30/02 705/14.56 |
| 5,950,173 A | 9/1999 | Perkowski | 705/26 |
| 5,956,693 A | 9/1999 | Geerlings | 705/14 |
| 5,970,469 A | 10/1999 | Scroggie et al. | 705/14 |
| 5,999,912 A * | 12/1999 | Wodarz | G06Q 30/02 705/14.61 |
| 6,014,634 A | 1/2000 | Scroggie et al. | 705/14 |

(Continued)

FOREIGN PATENT DOCUMENTS

| WO | WO 01/50371 A2 | 7/2001 |
|---|---|---|
| WO | WO 01/73577 A2 | 10/2001 |

OTHER PUBLICATIONS http://web.archive.org/web/20000302134918/http://www.nypost.com/, Mar. 2, 2000. (Year: 2000).*

(Continued)

*Primary Examiner* — Hani M Kazimi
(74) *Attorney, Agent, or Firm* — Cuenot, Forsythe & Kim, LLC (57) ABSTRACT

The unique session ID associated with a particular web session is presented to the website visitor in connection with an incentive for purchase of merchandise at an off-line store. The number can be recorded manually by the user, stored electronically, or can be presented in the form of a coupon which is printable on a printer attached to the computer or other device on which the user visits the website. To be eligible for the incentive, the user must present the session ID to personnel at the off-line store when completing the purchase. Once in possession of the session ID correlated to a particular purchase or purchases, the store/entity can use the session ID to review and analyze the operations performed and web pages visited during the session identified by the session ID, thereby giving the entity valuable information regarding what may have gone into the thought process of the user prior to making the purchase.

18 Claims, 5 Drawing Sheets

(56) References Cited

U.S. PATENT DOCUMENTS

| | | | | |
|---|---|---|---|---|
| 6,029,182 | A * | 2/2000 | Nehab | G06F 16/9535 |
| | | | | 715/205 |
| 6,073,112 | A | 6/2000 | Geerlings | 705/14 |
| 6,101,485 | A | 8/2000 | Fortenberry et al. | 705/27 |
| 6,105,001 | A | 8/2000 | Masi et al. | 705/14 |
| 6,128,624 | A | 10/2000 | Papierniak et al. | 707/104 |
| 6,185,541 | B1 | 2/2001 | Scroggie et al. | 705/14 |
| 6,202,210 | B1 | 3/2001 | Ludtke | 725/20 |
| 6,223,215 | B1 | 4/2001 | Hunt et al. | 709/217 |
| 6,230,153 | B1 | 5/2001 | Howard et al. | 707/2 |
| 6,292,786 | B1 | 9/2001 | Deaton et al. | 705/14 |
| 6,321,210 | B1 | 11/2001 | O'Brien et al. | 705/14 |
| 6,490,601 | B1 * | 12/2002 | Markus | G06F 17/243 |
| | | | | 705/80 |
| 2001/0029464 | A1 * | 10/2001 | Schweitzwer | 705/14 |
| 2002/0010627 | A1 * | 1/2002 | Lerat | 705/14 |
| 2002/0098845 | A1 * | 7/2002 | Hata et al. | 455/445 |
| 2002/0116266 | A1 * | 8/2002 | Marshall | 705/14 |
| 2002/0188508 | A1 * | 12/2002 | Lee et al. | 705/14 |

OTHER PUBLICATIONS http://web.archive.org/web/20000302110445/http://www.nypost.com/, Mar. 2, 2000. (Year: 2000).* http://web.archive.Org/web/20000302082701/http://www.nypost.com/, Mar. 1, 2000. (Year: 2000).* http://web.archive.org/web/19991114030418/http://www.nypost.com/, Nov. 13, 1999. (Year: 1999).*

"Enticing Online Shoppers to Buy—A Human Behavior Study," Fifth Intl. World Wide Web conference, May 6-10, 1996, Paris France, presented by Alice Richmond, http://www5conf.inria.fr/fich_html/papers/P50/Overview.html.

* cited by examiner

OBTAINING INFORMATION ON PURCHASING PROCESSES

BACKGROUND OF THE INVENTION

Field of the Invention

This invention relates to the field of e-commerce. More particularly, this invention relates to the correlation of web browsing with purchase behavior so that the effectiveness or ineffectiveness of web content can be more easily evaluated.

Description of the Related Art

Advances in and proliferation of the Internet has resulted in an explosion of the World Wide Web as a virtual marketplace. Electronic commerce ("e-commerce") is pervasive and has resulted in the categorization of retail markets into web-based e-commerce or traditional physical store locations, frequently referred to as "bricks and mortar" retailers.

E-commerce poses significant challenges for its participants. Traditional methods of analyzing customer behavior in a store (observation of an interaction with the customer) and determining what factors played a part in convincing a purchaser to make a purchase cannot be accomplished. Unless an e-commerce retailer is able to look over the shoulder of a perspective purchaser as they browse the web and research products prior to purchase, the retailer has very little information, other than the purchase itself, to use for analyzing the customer's behavior.

For a pure e-commerce company (a company that has no physical store location), significant effort has been directed to development of methods for tracking customer behavior prior to their making a "net-purchase", i.e., a purchase made completely on the web with delivery being facilitated electronically where possible or by mail if needed. Products such as IBM's WebSphere Site Analyzer allow the tracking of a user of a website so that the various actions taken by the user, e.g., clicking on a particular link, placing items into the electronic shopping cart, deletions from the electronic shopping cart, etc., can be stored and analyzed.

These web analytics applications use to their advantage the fact that most web applications treat a visit to a website, regardless of where the user navigates within that site, as a single "session". By establishing a "session ID" at the start of a session, and then logging the activity of the user during that session, the user's path through and activity on the website can be precisely tracked and studied. U.S. Pat. No. 6,223,215 to Hunt et al., incorporated fully herein by reference, gives a thorough explanation of tracking a user's activity prior to a net purchase based on a session ID.

The advent of e-commerce has also enabled traditional "brick and mortar" retailers to make their in-store inventory (referred to herein as "offline inventory") available on-line (referred to herein as "on-line inventory"). These "click and mortar" companies, such as Walmart, offer a full selection of on-line inventory that is almost equivalent to its off-line inventory; however, a very small percentage of on-line visitors actually make purchases on-line. For many reasons (security, privacy, value, experience), a high percentage of on-line visitors to a click and mortar website (e.g., walmart.com) are "cross-channel customers," that is, they use the website to research products and then make their purchases in the store. Worse yet for the click and mortar companies, many of these cross-channel customers make their purchase from competitors after using the website of the click and mortar company.

Click-and-mortar companies have developed many Web applications to woo their prospective on-line customers into their off-line stores. These applications provide features such as store locators that give detailed directions to store locations; on-line coupons that offer price savings and other incentives to purchase from the off-line store; and the ability to make an on-line purchase with off-line pickup at the store. However, while these applications may result in an increased likelihood that a user doing on-line web research on the website of a click and mortar company will ultimately make an off-line purchase at their store based on that research, there are no prior art systems that enable a correlation to be made between the details of the web research and the actual purchase in such a manner that the user's web activity during the research phase of their shopping experience can be identified and analyzed.

This "research on the web, purchase at the store" phenomenon presents a dilemma for click and mortar companies. To maximize the use of a particular website as a vehicle to facilitate purchases, the click and mortar company would like to be able to track the activity of the user on the website during a web session that results in a sale; however, present methods, e.g., on-line coupons, only tell the click and mortar company that someone was directed to the store from the website. They provide no information regarding the web activity during the session that led to the purchase, and this information may be extremely valuable for measuring and enhancing the effectiveness of the website.

Accordingly, there is a need for a mechanism by which a particular purchase made at an off-line store that resulted from an on-line research session can be tied to that session in such a way that the use of the website during that session can be tracked.

SUMMARY OF THE INVENTION

In accordance with the present invention, the unique session ID associated with a particular web session is presented to the website visitor in connection with an incentive for purchase of merchandise at the website's off-line store. The number can be recorded manually by the user, stored electronically, or can be presented in the form of a coupon which is printable on a printer attached to the computer or other device on which the user visits the website. To be eligible for the incentive, the user must present the session ID to personnel at the off-line store when completing the purchase. Once in possession of the session ID correlated to a particular purchase or purchases, the store/entity can use the session ID to review and analyze the operations performed and web pages visited during the session identified by the session ID, thereby giving the entity valuable information regarding what may have gone into the thought process of the user prior to making the purchase.

DETAILED DESCRIPTION OF THE PREFERRED EMBODIMENTS

In accordance with the present invention, a website visitor's on-line session ID is captured as part of an incentive offered to the visitor to draw the potential customer into the offline store to complete the purchase. Each time a visitor visits a Web site, the Web server normally creates a session, identified by the session ID, to track the visitor's activity. This session is unique to that visitor by virtue of the assignment of the unique session ID for that session. When a visitor accesses a predetermined product research scenario (such as viewing product descriptions, comparing product features, or using a store locator), the Web site makes incentive offers in an attempt to persuade the visitor to purchase the product at an offline store owned or otherwise affiliated with the on-line "store". The offers include the session ID as an integral part of the offer, i.e., the visitor must present the session ID at the store in some format to be able to redeem the offer.

Using this session ID, Web analytics applications, such as Web Sphere Site Analyzer by IBM, can correlate the off-line purchase to the exact on-line session that resulted in the consummation of the sale at the store, and analyze the session, making the evaluation of the visitor's Web experience much more simple and accurate.

Figure 1:
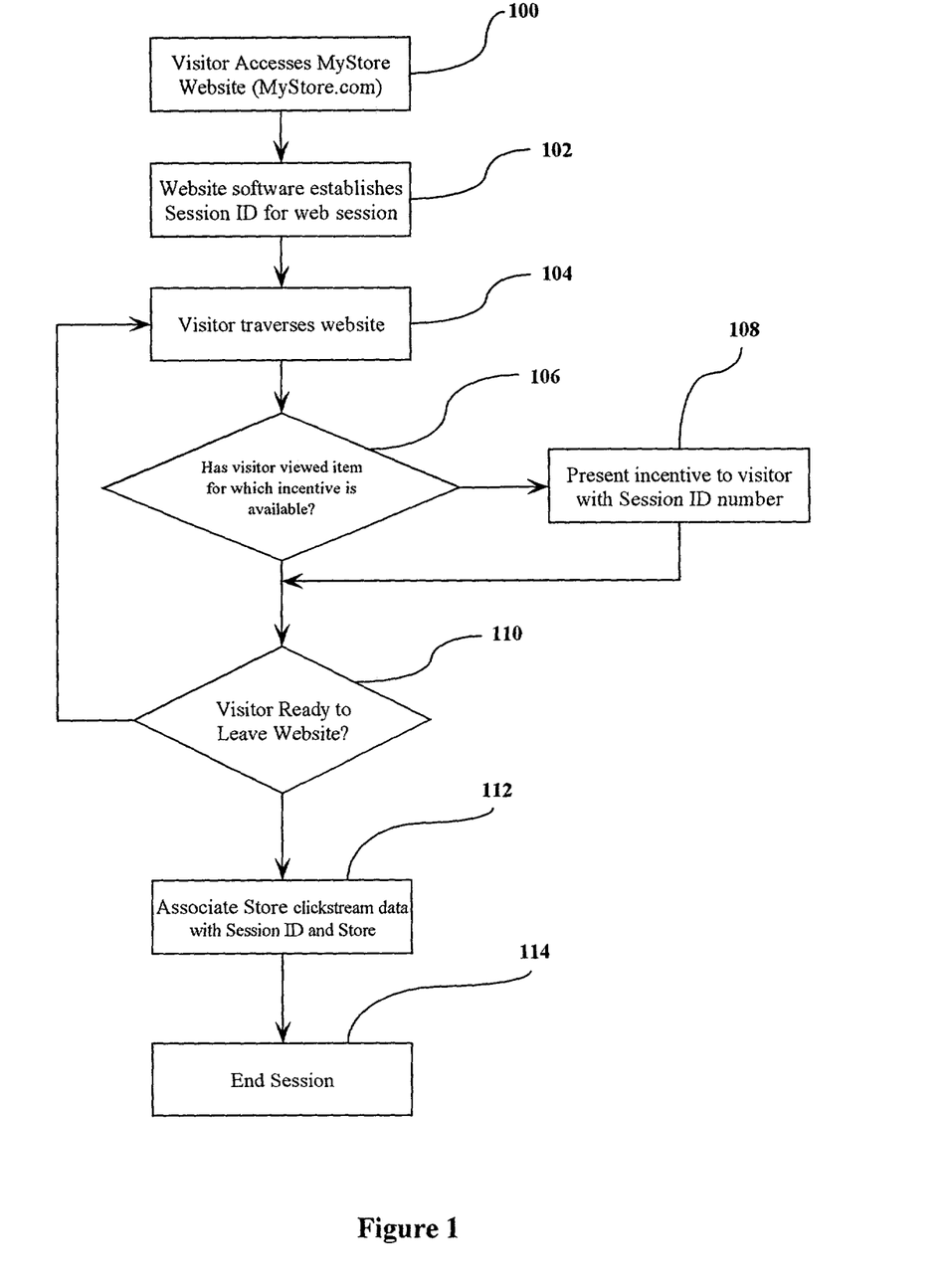
FIG. 1 is a flowchart illustrating the operation of the present invention in connection with a visit to the website of a fictional "click-and-mortar" store called "MyStore"

FIG. 1 is a flowchart illustrating the operation of the present invention in connection with a visit to the website of a fictional "click-and-mortar" store called "MyStore". Referring to FIG. 1, at step 100 a visitor accesses the website of MyStore (e.g., MyStore.com) to browse the available on-line inventory and potentially make a purchase. As part of the entry process to the website, the website software establishes, in a well known manner, a session ID for the particular web session.

At step 104 the visitor traverses the website in the typical manner. The visitor might, from an initial home page, navigate to a particular category of products, e.g., "Electronics"; "Luggage"; etc. On the selected page, the user might be presented a list of available merchandise and/or photographs of same. By positioning the cursor over one of the merchandise selections and double clicking a mouse, for example, the user would be brought to a page describing, in more detail, the merchandise selected, prices, shipping information, availability at an off-line store, etc.

At step 106, a determination is made as to whether or not the particular item being viewed by the visitor is an item for which an "off-line store incentive" is available. If such an incentive is available, at step 108, the visitor is presented with an incentive for purchasing the product at the off-line store. For example, the visitor may be given a reduced price for the off-line purchase or may be given a free item upon purchase at the off-line store, etc.

Figure 2:
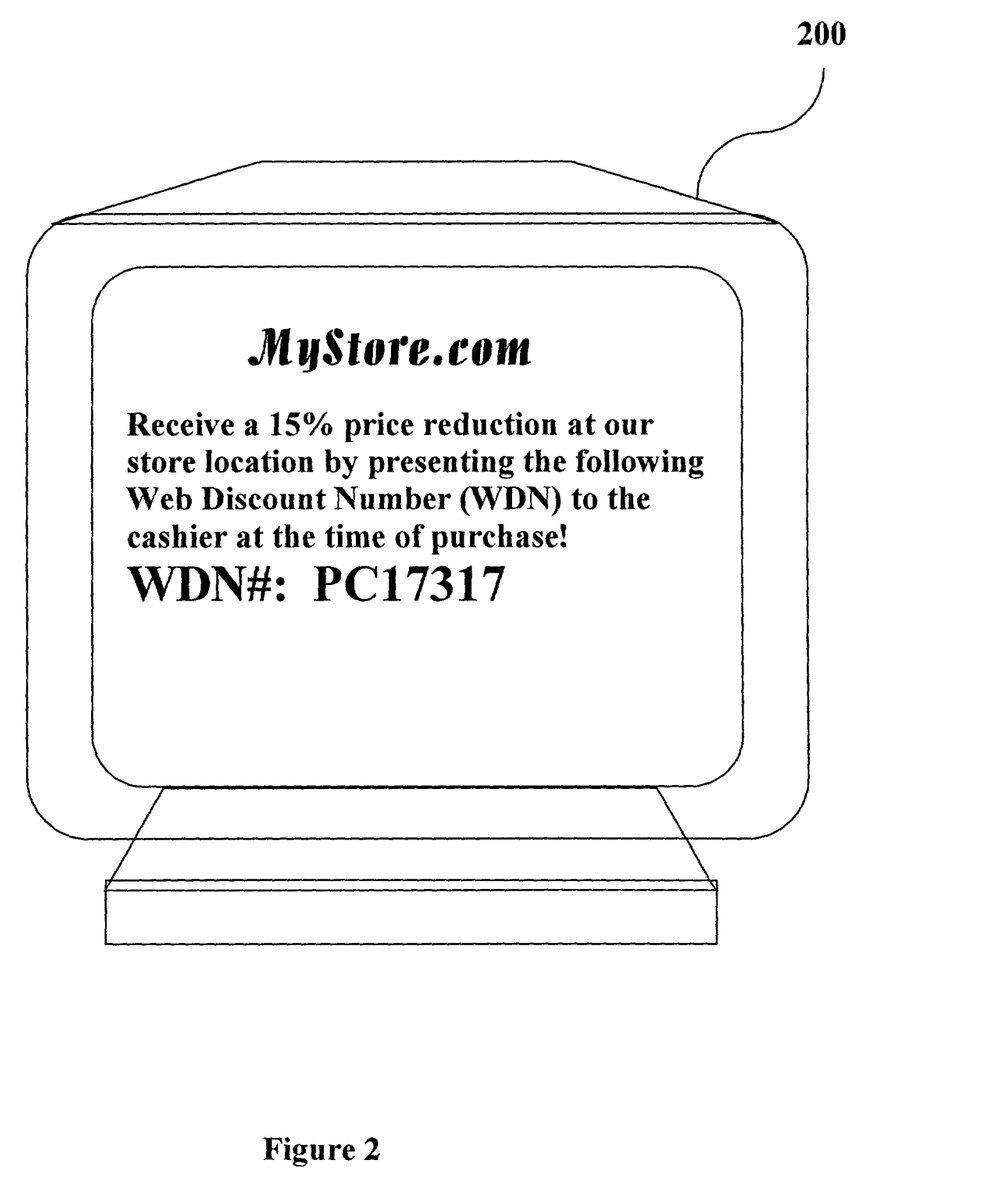
FIG. 2 illustrates how the incentive can be displayed to the visitor on a computer monitor being utilized to access the website.

There are numerous ways in which the incentive can be presented to the visitor. For example, as shown in FIG. 2, the incentive can be displayed to the visitor on a computer monitor 200 being utilized to access the website. This could occur in a separate pop-up screen, or interleaved between the link for the detailed description of the item and the page containing the detailed description of the item. As another alternative, the incentive could appear on the same page as the detailed description of the item. By presenting the incentive to the user in this manner, the user has the ability to write down the session ID (called a "Web Discount Number" (WDN) in the incentive illustrated in FIG. 2) or print the incentive page to an attached printer or a network printer.

Figure 3:
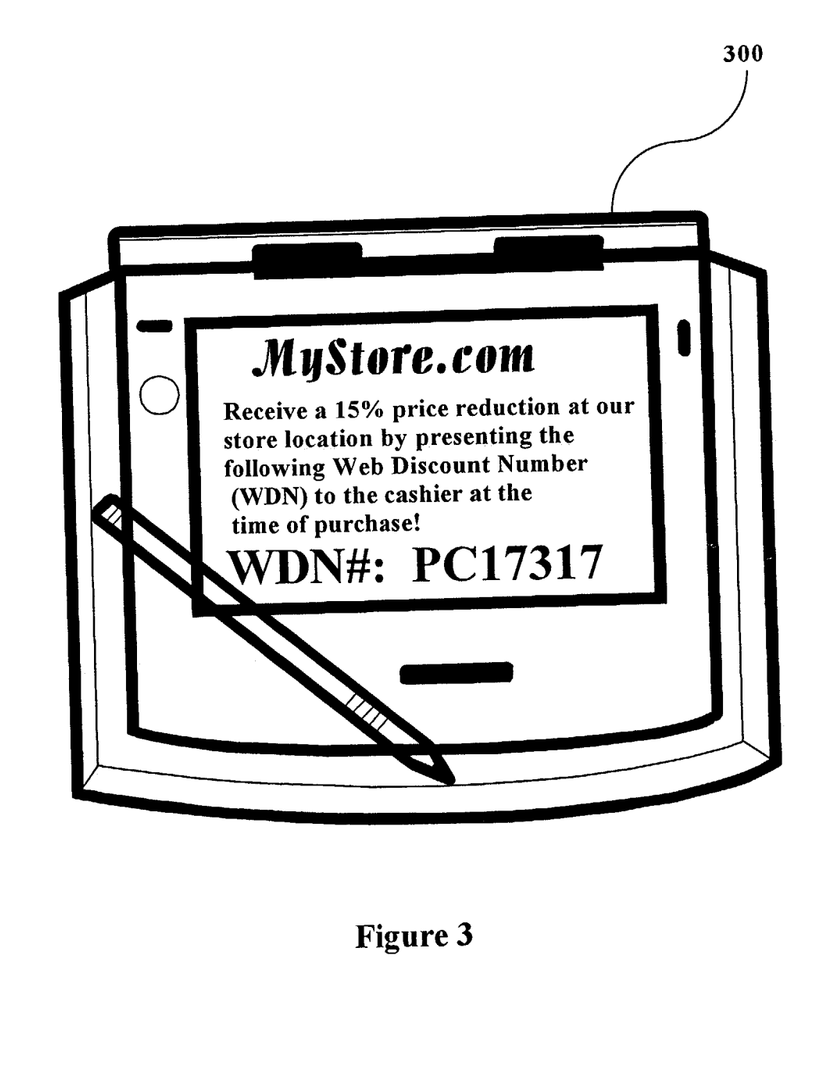
FIG. 3 illustrates the same incentive being displayed on a typical Personal Digital Assistant (PDA)

FIG. 3 illustrates the same incentive being displayed on a typical Personal Digital Assistant (PDA) 300. As more and more PDAs and cell phones become web-enabled, it is likely that more and more users will be browsing websites using them. Since these are typically portable devices and may be in use in a location where a printer is not available, since the WDN is prominently visible on the screen, the user is able to simply write down or otherwise record the WDN number and, as set forth in the incentive, bring that number to the store location and obtain the incentive. Alternatively, the PDA, cell phone, etc. can be configured in a known manner to allow storage of the displayed incentive, allowing the user to retrieve the incentive at the store so it can be shown to store personnel to obtain the incentive.

Figure 4:
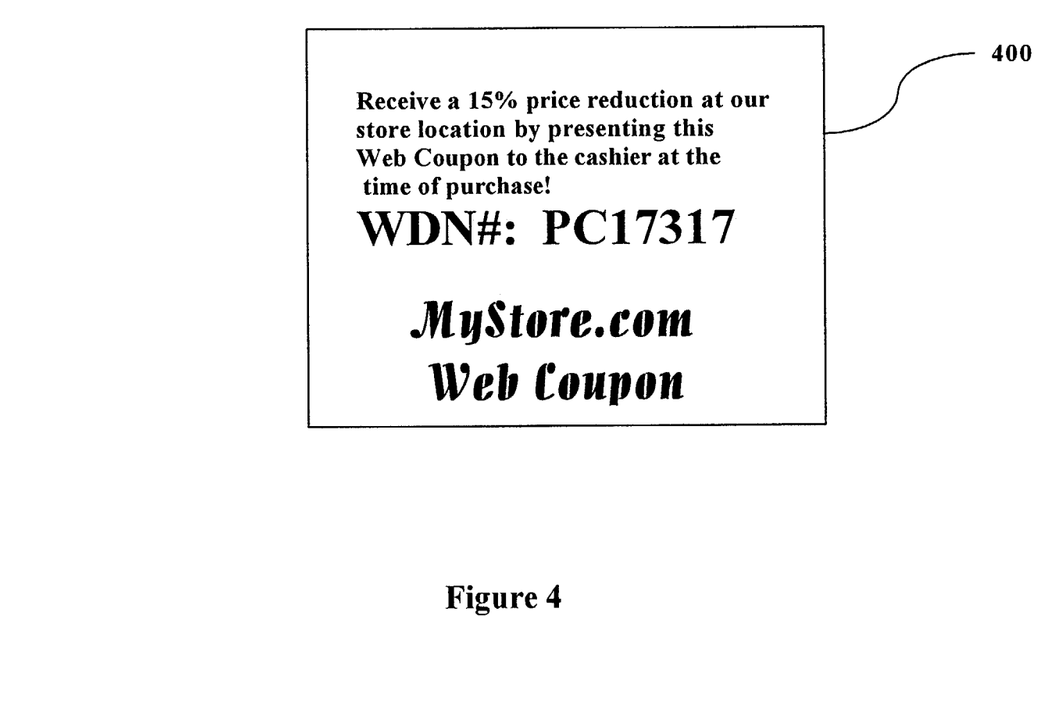
FIG. 4 illustrates another alternative in which the user is presented with the ability to print a coupon.

FIG. 4 illustrates another alternative in which the user is presented with the ability to print a coupon 400, which coupon must be presented to the cashier at the off-line store location in order to obtain the benefit of the incentive. Obviously other methods of displaying the incentive and the associated session ID number can be utilized as long as the user is given the option of either recording the number manually or printing out or saving the number for presentation at the store.

Referring back to FIG. 1, once the user has been presented with the incentive, the process proceeds to step 110. Note also that if at step 106, it is determined that the visitor has not viewed an item for which an incentive is available, the process also proceeds to step 110. At step 110, a determination is made as to whether or not the visitor is ready to leave the website. If the visitor continues on the website, the process proceeds back to step 104 where the visitor continues to navigate the website. If, at step 110, a determination is made that the visitor wishes to leave the website, at step 112, the click stream data for the session is associated with the session ID and is stored for use in analysis. At step 114, the session ends.

Figure 5:
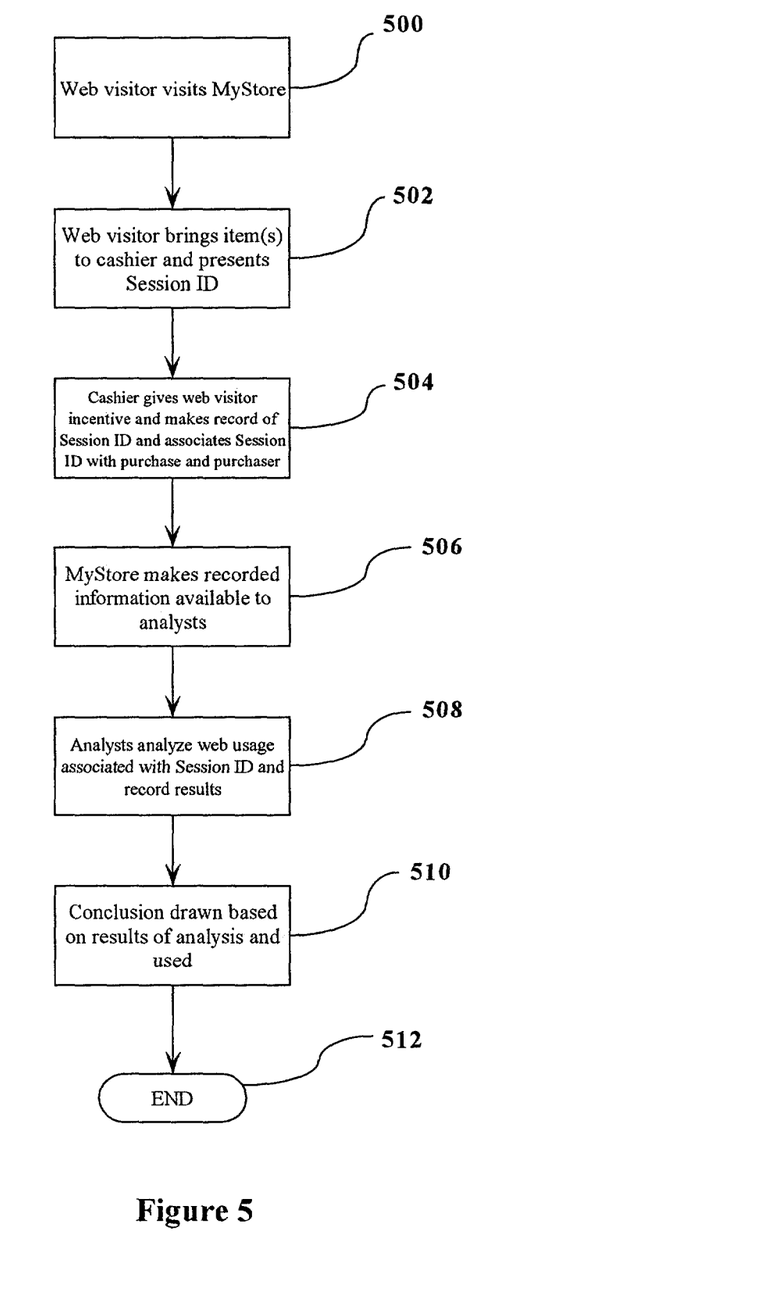
FIG. 5 illustrates an example of the steps involved in redeeming the incentive.

FIG. 5 illustrates an example of the steps involved in redeeming the incentive. At step 500, the web visitor visits the MyStore location (off-line store). At step 502 the web visitor obtains the item or items to be purchased and brings them to the cashier and presents the session ID number to the cashier. At step 504, the cashier completes the transaction and gives the purchaser the benefit of the incentive related to the session ID presented. This will involve the cashier identifying the incentive associated with the particular session ID, e.g., by searching a database that lists the incentives related to a particular session ID or retrieving this information from a printed list. Any method of identifying the specific incentives associated with a particular session ID can be used and it is contemplated that the claims of the present invention cover all such methods.

At step 504, the cashier also associates the particular purchase being made with the session ID and with the purchaser. It is contemplated that this can be performed by any available means, such as entries into a store computer or cash register which record this information in a known manner. By having this information, analysts will be able to identify a sale that was made at an off-line store that was based upon on-line research.

At step 506, the information recorded regarding the purchase and purchaser session ID is made available to store analysts (or analysts working on behalf of the store), and at step 508, the analysts analyze the web usage associated with the session ID and record the results of their analysis. For example, the analysts might study the various locations within the MyStore.com website that the visitor viewed; identify items that were added and then deleted from the electronic "shopping cart"; and then analyze this information to look for useful information regarding the visitor's use of the website and what may have led to their eventual purchase. Obviously many other well known forms of analysis can be conducted to ascertain what may have led to a successful off-line store purchase based upon on-line research. Web analytics applications such as WebSphere Site Analyzer may also be used.

At step 512 the process ends.

Using the present invention, analysts will have access to information pertaining to use of a website that resulted in an off-web purchase, information that is otherwise unavailable to them. This information will be obtained on a regular basis and without significant effort on the part of the store. This valuable information can assist the store in further development of its website to increase sales and to give them access to information regarding web browsing habits of typical consumers who actually make a purchase.

The above invention is described in connection with a method and system for tracing cross-channel customers. It is understood, and is fully clear to one of ordinary skill in the computer programming art, that one or more of the novel steps of the present invention may be implemented as computer program code executing on a computer. The computer program code may be embodied in a computer readable medium to form a computer program product.

Although the present invention has been described with respect to a specific preferred embodiment thereof, various changes and modifications may be suggested to one skilled in the art. For example, while specific methods presenting the session ID are given as examples above, it is understood that any method of presentation of the session ID to the eventual obtainer of the item falls within the scope of this invention. Thus, the session ID could be conveyed to the obtaining party by telephone, email message, voicemail message, electronic pager, and the like. Further, while the process described above focuses on web searching and offline purchases, the present invention will find application in any situation where there is a desire to tie the activity during a web search with an offline activity resulting from the web search, such as banding, obtaining of mortgages, obtaining of insurance, or any other situation where it is desired to measure the effectiveness of the Web channel as an information portal to attract customers. It is intended that the present invention encompass such changes and modifications as fall within the scope of the appended claims.

We claim:

1. A computer-implemented method of correlating interaction data with a website by a session participant during an on-line search session with obtaining of an item at an off-line location, comprising:
    assigning a session identifier to the session participant engaged in the on-line search session;
    associating the session identifier with the collected interaction data;
    storing the collected interaction data with the session identifier;
    electronically presenting, to the session participant, an incentive to obtain an item from an off-line location and that includes the session identifier;
    receiving, from the off-line location, purchasing data indicating:
        the item was obtained using the incentive, and
        the session identifier;
    producing correlation results by correlating, using the session identifier, the received purchasing data with previously-stored interaction data;
    analyzing the correlation results to identify elements, to be modified, of the website to improve sales generated from on-line searching; and
    causing the website to be modified by improving the identified elements.

2. The method of claim 1, wherein
the incentive and the session identifier are displayed on a display being used by the session participant.

3. The method of claim 2, wherein
the incentive is displayed as a coupon.

4. The method of claim 1, wherein
a determination is made, prior to presenting the incentive, whether the incentive exists for a particular item being viewed during the on-line search.

5. The method of claim 1, wherein
the website and the off-line location are commonly owned.

6. The method of claim 1, wherein
the session identifier was presented to the off-line location upon the item being obtained.

7. A computer hardware system configured to correlate interaction data with a website by a session participant during an on-line search session with obtaining of an item at an off-line location, comprising:
    a hardware processor configured to initiate the following executable operations:
        assigning a session identifier to the session participant engaged in the on-line search session;
        associating the session identifier with the collected interaction data;
        storing the collected interaction data with the session identifier;
        electronically presenting, to the session participant, an incentive to obtain an item from an off-line location and that includes the session identifier;
        receiving, from the off-line location, purchasing data indicating:
            the item was obtained using the incentive, and
            the session identifier;
        producing correlation results by correlating, using the session identifier, the received purchasing data with previously-stored interaction data;
        analyzing the correlation results to identify elements, to be modified, of the website to improve sales generated from on-line searching; and
        causing the website to be modified by improving the identified elements.

8. The system of claim 7, wherein
the incentive and the session identifier are displayed on a display being used by the session participant.

9. The system of claim 8, wherein
the incentive is displayed as a coupon.

10. The system of claim 7, wherein
a determination is made, prior to presenting the incentive, whether the incentive exists for a particular item being viewed during the on-line search.

11. The system of claim 7, wherein
the website and the off-line location are commonly owned.

12. The system of claim 7, wherein
the session identifier was presented to the off-line location upon the item being obtained.

13. A computer program product, comprising
a hardware storage device having computer-readable program code stored therein for correlating interaction data with a website by a session participant during an on-line search session with obtaining of an item at an off-line location, the computer-readable program code, which when executed by a computer hardware system, causes the computer hardware system to perform:
  assigning a session identifier to the session participant engaged in the on-line search session;
  associating the session identifier with the collected interaction data;
  storing the collected interaction data with the session identifier;
  electronically presenting, to the session participant, an incentive to obtain an item from an off-line location and that includes the session identifier;
  receiving, from the off-line location, purchasing data indicating:
    the item was obtained using the incentive, and
    the session identifier;
  producing correlation results by correlating, using the session identifier, the received purchasing data with previously-stored interaction data;
  analyzing the correlation results to identify elements, to be modified, of the website to improve sales generated from on-line searching; and
  causing the website to be modified by improving the identified elements.

14. The computer program product of claim 13, wherein the incentive and the session identifier are displayed on a display being used by the session participant.

15. The computer program product of claim 14, wherein the incentive is displayed as a coupon.

16. The computer program product of claim 13, wherein a determination is made, prior to presenting the incentive, whether the incentive exists for a particular item being viewed during the on-line search.

17. The computer program product of claim 13, wherein the website and the off-line location are commonly owned.

18. The computer program product of claim 13, wherein the session identifier was presented to the off-line location upon the item being obtained.

* * * * *